Aug. 31, 1965   H. FREDERICK   3,203,302
SELF-LOCKING SHEET METAL NUT
Filed Sept. 12, 1963

INVENTOR.
Henry Frederick
BY
Arthur A. March
ATTORNEY

United States Patent Office 3,203,302
Patented Aug. 31, 1965

3,203,302
SELF-LOCKING SHEET METAL NUT
Henry Frederick, 27 West Drive, Port Washington, N.Y.
Filed Sept. 12, 1963, Ser. No. 308,410
2 Claims. (Cl. 85—36)

This invention relates in general to the fastener art and more specifically to an improved self-locking nut and method of applying the same.

An object of this invention is to provide an improved self-locking nut formed of flat stock material.

Another object of this invention is to provide an improved self-locking nut of resilient flat stock material that is preformed into a shape which can be cocked inside out and which due to its inherent instability can be sprung back to its original form to positively secure the nut to the shank of a bolt or stud to effect a positive locking of the nut on the shank.

Another object of this invention is to provide an improved self-locking nut that is relatively simple in construction, inexpensive to manufacture and positive in operation.

Another object of this invention is to provide a method of applying a self-locking nut to the shank of a stud or bolt for securing the same thereto.

The foregoing objects and other features and advantages of this invention are attained by a self-locking nut formed of a resilient or spring sheet material formed with an aperture for receiving the shank end of a stud or bolt. The sheet material is preformed and tempered so as to impart thereto an arcuate shape that is curvilinear in cross-section. The general configuration of the material or piece from which the nut is formed may comprise of any equilateral or regular geometric shape, as for example, a square, rectangle, triangle or polygon. A plurality of slits are radially formed about the aperture to facilitate bending of opposed portions of the periphery of the aperture to one side of the plane of the nut to define grippers for engaging the shank end of a nut or bolt. Other opposed portions of the periphery are laterally bent outwardly thereof to the other side of the plane of the nut to define spacers for the nut. In applying the spring nut of the described construction to the shank end of a nut or bolt the preformed nut is first turned inside out by passing the plane of the nut through its dead-center or flat position. With the nut thus cocked inside out, the same is placed on the end of the shank until the spacers position the cocked nut against the workpiece to be secured. A force is then applied to the cocked nut to spring the same back through its dead-center position and into its original preformed position whereupon the peripheral portions of the nut engage the workpiece and positively secure the grippers of the nut to the shank of the bolt or stud.

A feature of this invention resides in the provision that the initial geometric shape of the nut may assume any desired equilateral or regular configuration.

Another feature resides in the provision that the lock nut is formed of tempered spring steel which can be readily forced inside out and which due to its inherent instability can be sprung back to its original shape.

Another feature of this invention resides in the provision that the gripper and spacer elements are blanked out of the plane of the nut adjacent the periphery of the aperture formed therein.

Another feature of this invention resides in the provision that the lock nut of the instant construction can be readily applied to the shank end of a nut or bolt in a relatively simple manner and with a minimum of effort.

Another feature of this invention resides in the provision in that the tempered preformed shape of the nut facilitates positive engagement of the grippers to the shank end of a nut or bolt.

Other features and advantages will become more readily apparent when considered in view of the drawings and specification in which.

Figure 2:
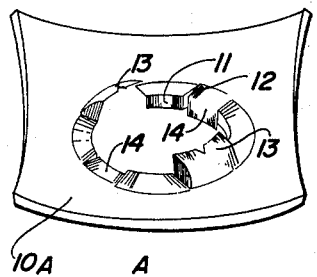
FIG. 2 illustrates the self-locking nut of FIG. 1 in its cocked position and readied to be applied to the shank of the nut or bolt.
Figure 3:
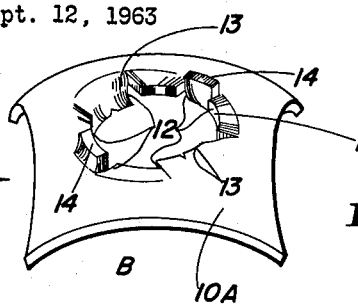
FIG. 3 is a bottom view of the cocked nut as shown in FIG. 2.

Referring to the drawings there is shown therein the improved self-locking nut 10 of the instant invention. The self-locking nut 10 is formed from flat metal stock of resilient material, as for example, spring steel or the like. In the illustrated embodiment, the lock nut 10 is illustrated as being initially formed from a substantially square piece of flat stock. However, it will be understood that the lock nut 10 of the instant invention may be formed in any regular or equilateral, geometric shape, as for example, a rectangle, triangle or from any regular polygonic shaped piece.

An aperture 11 is formed centrally of the flat stock. In accordance with this invention a plurality of slits 12 are formed to extend radially about the periphery of the aperture 11. As shown, the slits 12 extend radially only a slight distance and define opposed portions of the periphery which are bent outwardly of the plane of the nut. In the illustrated embodiment opposed portions of the periphery are bent to one side of the nut to define grippers 13 and other opposed portions are bent out of the plane of the nut to the other side thereof to define spacers 14.

In accordance with this invention the stock of the lock nut 10 is preformed and tempered so as to impart thereto an arcuate shape, that is, curvilinear in cross-section. In the smaller sizes, the lock nut 10, constructed in accordance with this invention, more or less assumes a conical shape in its preformed position. In the larger sizes the preformed and tempered shape of the lock nut takes on the appearance of a spherical section. Accordingly, as the nut 10 is preformed in an arcuate shape having a curvilinear cross-section and made of tempered spring steel stock, it can be readily forced inside out, and due to its inherent instability can be then sprung back to its original shape.

Figure 4:
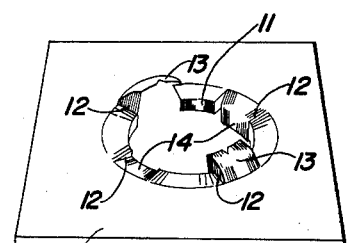
FIG. 4 illustrates the perspective view of the instant lock nut in its dead-center position.
Figure 1:
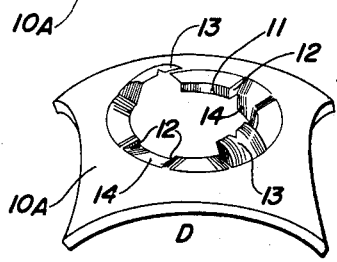
FIG. 1 illustrates a perspective view of the improved self-locking nut of this invention in its hardened and tempered preformed position prior to cocking.
Figure 5:
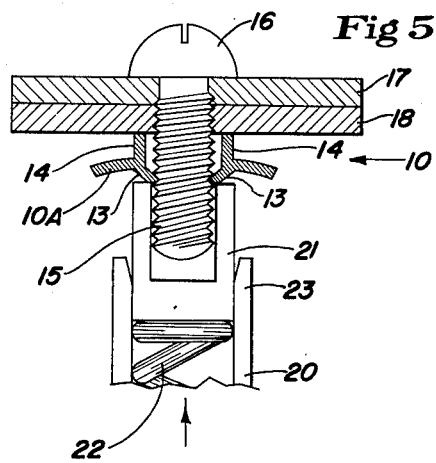
FIG. 5 illustrates a cross-sectional view of the instant lock nut as applied to the shank end of a bolt immediately prior to springing the same to its initial preformed position.

Consequently, to apply the self-locking nut 10 of the construction described to the shank end 15 of a bolt or stud 16, the preformed self-locking nut 10, as disclosed in FIG. 1, is first turned inside out to assume a position as shown in FIG. 2 and FIG. 5. Thus, in turning the lock nut 10 of FIG. 1 to its inside out position, as shown in FIG. 2, the surface portion 10A of the nut is passed through its dead-center position, as shown in FIG. 4. With the nut 10 cocked to its inside out position, as shown in FIG. 2, the same is then applied to the shank 15 of a stud or bolt 16. As shown in FIG. 5 the shank of the bolt or stud is extended through a pair of workpieces 17, 18 which are to be secured together.

The lock nut 10 in its cocked position is fitted or threaded to the shank 15 of the stud or bolt 16 until the ends of the spacer 14 are brought into engagement with the workpiece 18 to be secured. With the cocked nut 10 so positioned it is sprung back to its initial preformed state.

To facilitate springing the cocked nut 10, tool 19 is brought into axial alignment with the shank 15 of the stud, with the end of the tool urged against the lock nut 10. As partially illustrated in the drawings, the tool 19 comprises an outer elongated sleeve 20 which has a stud socket 21 reciprocally mounted therein. A coil spring 22 is utilized to normally bias the stud socket 21 outwardly beyond the end of the sleeve 20. Means not shown prohibit the socket 21 from separating from the sleeve 20.

Figure 7:
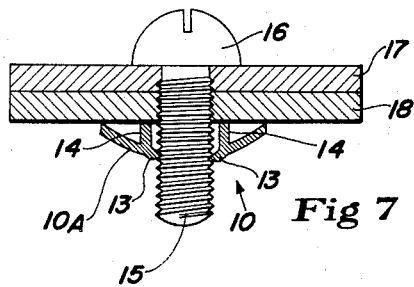
FIG. 7 illustrates a sectional view similar to that of FIG. 5, but illustrating the lock nut in its operative assembled position.
Figure 6:
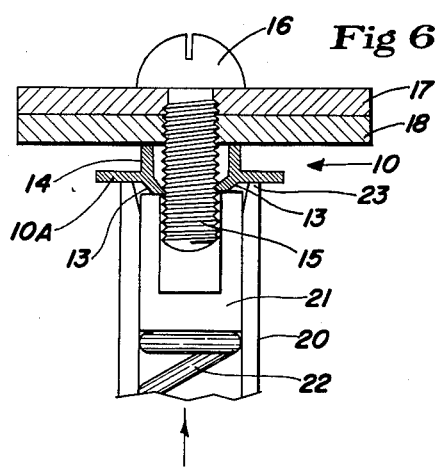
FIG. 6 is a view similar to that of FIG. 5 but showing the arrangement whereby the applying tool is forcing the lock nut through its intermediate or dead-center position.

Therefore, to spring the lock nut 10 back into its operative preformed position, the stud socket 21 of the tool 19 is brought up against the grippers 13 of the lock nut. Thus, when an axial force is applied in the direction of the stud to the remote end of the sleeve (not shown) the spring 22 is compressed causing the end 23 of the sleeve 20 to engage the surface portions 10A of the lock nut 10. As shown in FIG. 6, continued applied axial force to the sleeve 20 causes the end thereof to force the surface portions 10A of the nut toward the workpiece 18 to be secured. In FIG. 6 the surface portion 10A of the lock nut 10 is disposed to be forced through intermediate or dead-center position of the lock nut. As the surface portions 10A pass through the dead center position, the lock nut is sprung into engagement with the workpiece 18. Once the surface portions 10A of the lock nut have been sprung to its operative preformed position on the stud, the tool 19 is removed. Thus, as shown in FIG. 7, the spring lock nut 10 is positively secured to the shank 15 of the stud or bolt 16 and, as a result, the workpieces 17, 18 are firmly secured together. It is to be further noted that the spacers 14 prohibit the workpieces 17, 18 from recocking and loosening the lock nut 10 once the nut has been positioned on the stud or bolt 16.

From the foregoing description it will be noted that the instant self-locking nut construction is relatively simple, can be easily fabricated, and is positive in operation. Also, the arrangement is such that the lock nut 10 described can be readily attached to a shank or shaft 15 of a stud or bolt 16 with a minimum of effort. The lock nut is such that it can be applied either to a threaded shank of a bolt or a smooth shank of a stud. The arrangement of the grippers 13 is such that in the operative position of the nut, the tip ends of the grippers bite into the shank of the stud or bolt to frictionally grip the same. From the foregoing it will be apparent that the construction is relatively simple and can be readily fabricated at a minimum of cost.

While the instant invention has been disclosed and described with reference to a particular embodiment thereof, it will be apparent that variations and modifications thereof may be made without departing from the spirit or scope of the invention.

I claim:
1. A self-locking nut comprising
  (a) a sheet of tempered spring steel having an aperture centered therein for receiving the shank of a bolt or stud to secure a workpiece thereto,
  (b) said sheet being preformed with an arcuate shape having a curvilinear cross-section,
  (c) said aperture having opposed peripheral portions thereof bent out of the plane and inclined to the convex side of said preformed shape to define grippers for engaging the shank of the bolt or stud fitted through said aperture,
  (d) said aperture having other portions of its periphery bent out of the plane and projected to the concave side of said preformed shape to define spacers for spacing the sheet from the workpiece,
  (e) and said shape being turned inside out prior to receiving the shank of said bolt or stud so that said shape can be sprung back to its initial preformed position when said spacers are positioned against the workpiece to bring the marginal portions of the sheet into engagement with the workpiece whereby the same is locked onto the shank of the stud or bolt.

2. A self-locking nut comprising
  (a) a metallic sheet of tempered spring material having an aperture therein for receiving the shank of a bolt or stud to secure a workpiece, said sheet material being preformed into an operative shape that is concave-convex,
  (b) said aperture having radial extending slits to define peripheral portions thereof which are bent out of the plane of said sheet material to define grippers for engaging the shank of a bolt or stud fitted through said aperture, and
  (c) said apertures having other portions of said periphery oppositely bent out of the plane of said sheet material,
  (d) said other portion serving as spacers for spacing the plane of said sheet material from the workpiece to be fastened,
  (e) said preformed sheet material being forced inside out prior to receiving the bolt,
  (f) and said sheet material being sprung to its original position when said spacers are positioned against the workpiece so that the corners of said sheet material frictionally engages the workpiece and securely maintains said grippers in engagement with the shank of the bolt or stud.

References Cited by the Examiner

UNITED STATES PATENTS

| | | | |
|---|---|---|---|
| 1,059,420 | 4/13 | Worth | 151—30 |
| 1,952,483 | 3/34 | Wilson | 151—30 |
| 2,415,540 | 2/47 | Simmons | 85—36 |
| 2,982,989 | 5/61 | Heyer | 85—36 |

CARL W. TOMLIN, *Primary Examiner.*

EDWARD C. ALLEN, *Examiner.*